(12) United States Patent
Conover et al.

(10) Patent No.: US 6,701,314 B1
(45) Date of Patent: Mar. 2, 2004

(54) SYSTEM AND METHOD FOR CATALOGUING DIGITAL INFORMATION FOR SEARCHING AND RETRIEVAL

(75) Inventors: Joan Evelyn Conover, Smithfield, VA (US); Douglas McCoy Anthony, Portsmouth, VA (US)

(73) Assignee: Science Applications International Corporation, San Diego, CA (US)

( * ) Notice: Subject to any disclaimer, the term of this patent is extended or adjusted under 35 U.S.C. 154(b) by 0 days.

(21) Appl. No.: 09/489,735

(22) Filed: Jan. 21, 2000

(51) Int. Cl.[7] ................................. G06F 7/00
(52) U.S. Cl. ................... 707/7; 707/2; 707/10; 707/104.1; 709/217; 715/506; 715/531
(58) Field of Search ................ 707/1–10, 104.1; 709/217; 715/506, 531

(56) References Cited

U.S. PATENT DOCUMENTS

| | | | | |
|---|---|---|---|---|
| 6,151,624 A | * | 11/2000 | Teare et al. ................ | 709/217 |
| 6,233,575 B1 | * | 5/2001 | Agrawal et al. ............. | 707/6 |
| 6,236,991 B1 | * | 5/2001 | Frauenhofer et al. ......... | 707/6 |
| 6,253,239 B1 | * | 6/2001 | Shklar et al. ............... | 709/217 |
| 6,301,579 B1 | * | 10/2001 | Becker ....................... | 707/102 |
| 6,397,209 B1 | * | 5/2002 | Reed et al. .................. | 707/3 |

* cited by examiner

*Primary Examiner*—Kim Vu
*Assistant Examiner*—Hung Pham
(74) *Attorney, Agent, or Firm*—Kilpatrick Stockton LLP

(57) ABSTRACT

The system and method for searching and retrieving information stored in heterogeneous information repositories. A portal server retrieves user requests through a computer network and looks up information stored in a metadata databases. For example, the metadata may be encoded in an XML/RDF format and stored in a directory server to facilitate effective searching and retrieval of information from an information repository. Metadata includes information including a classmark definition for each document. The classmark is determined through an automated cataloguing process.

14 Claims, 6 Drawing Sheets

| | |
|---|---|
| URL: | http://www.saic.research.com/source/agriculture1.txt |
| Title: | |
| Author: | |
| Abstract: | |
| Collection: | |
| Keyword: | |
| MatchedWords: | field; general |
| Path: | source/agriculture1.txt |
| Classmark: | Ordnance.Aerial Bombs; Ordnance.Underwater Ordnance |
| Classification_date: | Wed Aug 18 15:50:31 EDT 1999 |
| Last_modified: | |

Figure 3

```xml
<?xml version="1.0"?>

<rdf:RDF
    xmlns:rdf="http://www.w3.org/1999/02/22-rdf-syntax-ns#"
    xmlns:rdfs="http://www.w3.org/TR/1999/PR-rdf-schema-19990303#">

<rdf:Description ID="URL">
    <rdf:type rdf:resource="http://www.w3.org/TR/PR-rdf-syntax#Property"/>
    <rdfs:subPropertyOf resource="http://purl.org/metadata/dublin_core#Identifier"/>
    <rdfs:label>URL</rdfs:label>
    <rdfs:comment>URL of the resource that uniquely identifies this resource.
        </rdfs:comment>
</rdf:Description>

<rdf:Description ID="Title">
    <rdf:type rdf:resource="http://www.w3.org/TR/PR-rdf-syntax#Property"/>
    <rdfs:subPropertyOf resource="http://purl.org/metadata/dublin_core#Title"/>
    <rdfs:label>Title</rdfs:label>
    <rdfs:comment>The title of the resource.</rdfs:comment>
</rdf:Description>

<rdf:Description ID="Author">
    <rdf:type rdf:resource="http://www.w3.org/TR/PR-rdf-syntax#Property"/>
    <rdfs:subPropertyOf resource="http://purl.org/metadata/dublin_core#Creator"/>
    <rdfs:label>Author</rdfs:label>
    <rdfs:comment>The author of the resource.</rdfs:comment>
</rdf:Description>

<rdf:Description ID="Abstract">
    <rdf:type rdf:resource="http://www.w3.org/TR/PR-rdf-syntax#Property"/>
    <rdfs:subPropertyOf resource="http://purl.org/metadata/dublin_core#Description"/>
    <rdfs:label>Abstract</rdfs:label>
    <rdfs:comment>The abstract of the resource.</rdfs:comment>
</rdf:Description>

<rdf:Description ID="Collection">
    <rdf:type rdf:resource="http://www.w3.org/TR/PR-rdf-syntax#Property"/>
    <rdfs:subPropertyOf resource="http://purl.org/metadata/dublin_core#Type"/>
    <rdfs:label>Collection</rdfs:label>
    <rdfs:comment>The type of the resource, like Technical Report.</rdfs:comment>
</rdf:Description>

<rdf:Description ID="Keyword">
    <rdf:type rdf:resource="http://www.w3.org/TR/PR-rdf-syntax#Property"/>
    <rdfs:subPropertyOf resource="http://purl.org/metadata/dublin_core#Subject"/>
    <rdfs:label>Keyword</rdfs:label>
    <rdfs:comment> This is a keyword from the document that matched a keyword
        in an appropriate class representative. A number of keywords will
        normally appear in an RDF Bag container.</rdfs:comment>
</rdf:Description>
```

Figure 4A

```xml
<rdf:Description ID="MatchedWords">
  <rdf:type rdf:resource="http://www.w3.org/TR/PR-rdf-syntax#Property"/>
  <rdfs:subPropertyOf resource="http://purl.org/metadata/dublin_core#Subject"/>
  <rdfs:label>Matched Words</rdfs:label>
  <rdfs:comment> The words from the document that matched the classification. A
     number of keywords will normally appear in an RDF Bag container.</rdfs:comment>
</rdf:Description>

<rdf:Description ID="Path">
  <rdf:type rdf:resource="http://www.w3.org/TR/PR-rdf-syntax#Property"/>
  <rdfs:label>Path</rdfs:label>
  <rdfs:comment> The hard, file system path of the document,as compared to URL.
  </rdfs:comment>
</rdf:Description>

<rdf:Description ID="Classmark">
  <rdf:type rdf:resource="http://www.w3.org/TR/PR-rdf-syntax#Property"/>
  <rdfs:subPropertyOf resource="http://purl.org/metadata/dublin_core#Subject"/>
  <rdfs:label>Classmark</rdfs:label>
  <rdfs:comment>This is a classmark that has been assigned to the document
     as a result of the automatic classification process.</rdfs:comment>
</rdf:Description>

<rdf:Description ID="Classification_date">
  <rdf:type rdf:resource="http://www.w3.org/TR/PR-rdf-syntax#Property"/>
  <rdfs:label>Classification_date</rdfs:label>
  <rdfs:comment>The date on which the resource was classified.</rdfs:comment>
</rdf:Description>

<rdf:Description ID="Last_modified">
  <rdf:type rdf:resource="http://www.w3.org/TR/PR-rdf-syntax#Property"/>
  <rdfs:subPropertyOf resource="http://purl.org/metadata/dublin_core#Date"/>
  <rdfs:label>Last_modified</rdfs:label>
  <rdfs:comment>The date on which the resource was last modified.</rdfs:comment>
</rdf:Description>

</rdf:RDF>
```

Figure 4B

```
<?xml version="1.0"?>
<rdf:RDF
  xmlns:rdf="http://www.w3.org/1999/02/22-rdf-syntax-ns#"
  xmlns:oc="http://www.saic.research.com/RDF/schema#">
    <rdf:Description about="http://www.saic.research.com/RDF/source/agriculture1.txt">
        <oc:URL>http://www.saic.research.com/source/agriculture1.txt</oc:URL>
        <oc:Title></oc:Title>

<oc:Author></oc:Author>
        <oc:Abstract></oc:Abstract>

<oc:Path>source/agriculture1.txt</oc:Path>

<oc:Keyword></oc:Keyword>
        <oc:MatchedWords>
            <rdf:Bag>
                <rdf:li>field</rdf:li>
                <rdf:li>general</rdf:li>
            </rdf:Bag>
        </oc:MatchedWords>
        <oc:Classmark>
            <rdf:Seq>
                <rdf:li>Ordnance.Aerial Bombs</rdf:li>
                <rdf:li>Ordnance.Underwater Ordnance</rdf:li>
            </rdf:Seq>
        </oc:Classmark>
        <oc:Classification_date>Wed Aug 18 15:50:31 EDT 1999
        </oc:Classification_date>
        <oc:Last_modified></oc:Last_modified>
    </rdf:Description>
</rdf:RDF>
```

Figure 5

SYSTEM AND METHOD FOR CATALOGUING DIGITAL INFORMATION FOR SEARCHING AND RETRIEVAL

The present invention relates to the field of information indexing, cataloguing and retrieval, and in particular to a system and method for automatically cataloguing Internet information repositories, creating an eXtensible Markup Language (XML) metaindex in an encoded XML format (i.e., the Resource Description Framework (RDF) format), and providing a mechanism to effectively search and retrieve the information.

BACKGROUND

In the last few years, there has been an explosion of information available on the Internet. In the very early 1990s, the Internet was a network consisting of computers from military, research, and educational organizations. There were small collections of information available through mostly file transfer protocol (FTP) sites and Gopher sites. With the advent of the web and increases in bandwidths beginning in about 1993s, people began to put more and more information on the Internet.

Originally, the Internet was only available for non-commercial research and educational use. When the Defense Advanced Research Projects Agency (DARPA) relaxed usage restrictions, finally permitting commercial use, Internet usage exploded. Today, most households have Internet access and anyone with Internet access can publish information on the Internet.

Shortly after the advent of the web, users realized that there was a need to have a way to search the Internet to assist users in locating information. Websites such as Lycos™ and AltaVista™ were developed to meet this need. These sites used spiders to scan the Internet for content, collecting and indexing keywords. These full-text-based indexes were then used on a website to assist users in searching the Internet to locate needed information. This method was effective when the Internet was young. Recognizing problems associated with large quantities of indexes, many larger search engine sites, such as Yahoo™ and Excite™, began to manually catalogue the indexed material. Manual cataloguing is not an effective methodology for organizing the vast amount of information on the WWW.

Today, most of the available content is unstructured so that it is difficult to locate pertinent data. Anyone with Internet access can publish any information they wish on the Internet. As the cost of access and disk space has decreased, the volume of information available has grown tremendously. Elementary search engines that simply create indexes of keywords are becoming increasingly ineffective in identifying relevant documents. There is a growing need for more effective search systems.

There is an additional need to provide a search system that can be used to perform a search across many heterogeneous information retrieval systems. For example, many organizations have built information retrieval systems to permit users to obtain documents published by that organization. It is desirable to provide a search system that can index and catalogue information stored in many different formats on different websites, permitting users to perform a search through a single web portal.

Finally, there is a need to provide a system for performing automated cataloguing and indexing of documents. Prior art systems have simply created keyword indexes. There is a need for a system that uses a thesaurus and a classification system to determine both keywords for an indexed document but also a class for the document to permit more effective search and retrieval of information.

As the quantity of information available on the Internet grows, it is becoming more and more important to provide more advanced search and retrieval capabilities. Keyword indexing alone is proving inadequate in providing a search system that permits a user to effectively locate and access information on the Internet.

BRIEF DESCRIPTION OF THE DRAWINGS

In the drawings:

FIG. 3 shows a sample metadata data structure according to one embodiment of the present invention;

FIG. 4 depicts a sample Resource Description Framework (RDF) schema according to one embodiment of the present invention; and FIG. 5 depicts a sample XML/RDF representation of document metadata according to an embodiment of the present invention.

SUMMARY

Figure 1:
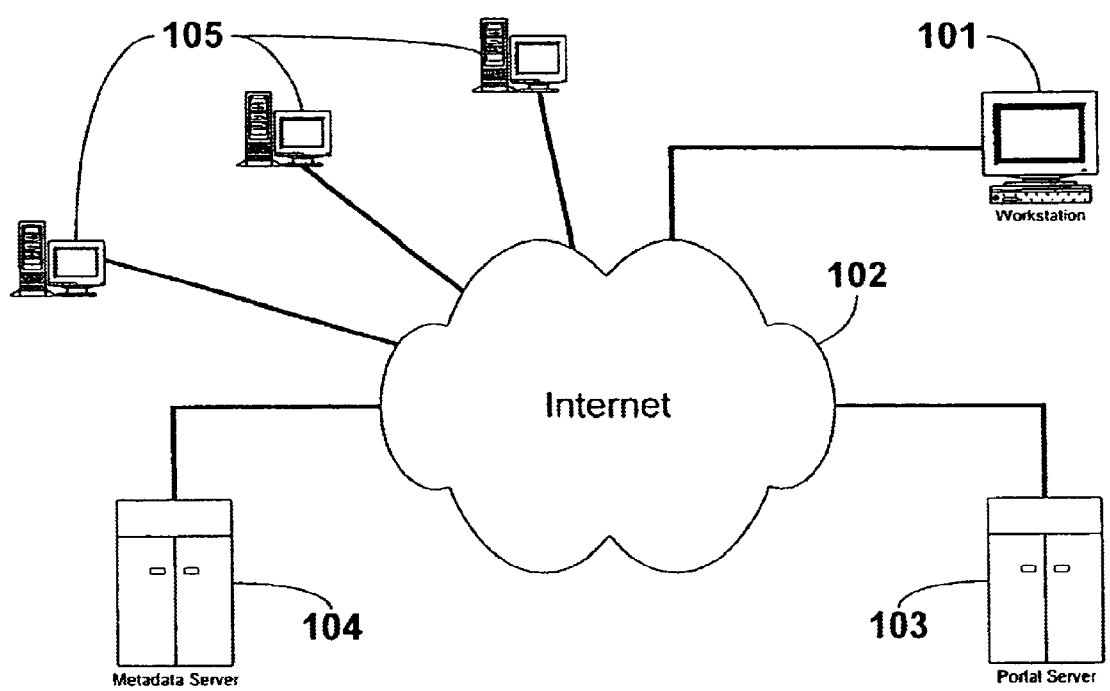
FIG. 1 depicts a diagram of a digital library according to one embodiment of the present invention.

An embodiment of the present invention provides a method and system for indexing and cataloguing data stored on one or more information repositories. The information repositories may be distributed on a computer network. As the data stored in the information repositories is scanned, keywords are collected and indexed. The keywords are used to catalogue the data and to create metadata that is stored to assist in searching and retrieval of the data.

One embodiment of the present invention is an information search and retrieval system. A user sends a request to perform a search or retrieve data to a web portal server. The server then uses stored metadata to identify relevant documents. The data can then be retrieved and sent to the user. The metadata may be stored on the web portal server or may be located on one or more metadata servers.

Some embodiments of the present invention store metadata information encoded in the eXtensible Markup Language (XML). In addition, some embodiments use the Resource Description Framework (RDF) to define and store the metadata.

Various embodiments of the present invention fulfill one or more of the needs discussed above. These embodiments will be described in detail below in the detailed description of the invention.

DETAILED DESCRIPTION

To build an effective and growing information infrastructure, it is necessary to integrate or catalogue collections of heterogeneous digital libraries. Integrated information repositories form a federated digital library in the form of an index accessible through web portal technology. Such an index encapsulates the specific operations or contents of individual member libraries or data-marts with an XML wrapper, making access to the constituent repositories transparent to the user.

Some problems that had to be solved to integrate digital libraries in an index structure according to the present invention were the following: (1) integrating existing digital libraries into a federated digital library; (2) insulating the federated digital library from changes made in individual digital libraries; (3) making relocation of individual digital libraries transparent to users; and (4) overcoming the lack of sufficient metadata in some digital libraries.

Prior art libraries with meta-indexes have no automated classification ability to populate key descriptor fields based on domains or classification schemes. One embodiment of the present invention can be used to expand the descriptor fields, allowing a more robust index of library assets.

XML with its tremendous support by the Web community can serve as a meta language, accepted by most digital libraries, to specify interfaces and methods of interactions. The eXtensible Markup Language (XML) is a simple dialect of SGML that has been endorsed by the W3C consortium. This meta-tagging approach makes it possible for a library to implement its own policies and features as well as to change them as long as it is able to describe these changes in the XML-based language, specifically an index built in the Resource Description Framework (RDF). In particular, it does not require any existing library to change its architecture but only to describe it.

RDF is an XML application that adds semantics to documents by encoding and using metadata. For example, RDF could be used to encode content advisory ratings, information about the author, and licensing or copyright information. RDF is a general purpose XML application that can be used to encode any metadata. One embodiment of the present invention creates metadata regarding a document and stores that information using RDF. Other embodiments of the present invention use a relational database to store metadata information.

FIG. 1 describes a Web portal architecture using RDF indexes based on XML technology integrating different digital libraries. Search engines, with a knowledge of XML/RDF, then can access/filter for relevant data.

A user logs on to the system using workstation 101. In one embodiment, workstation 101 is any computing device that can run a web browser. For example, workstation 101 can be: a personal computer running Microsoft™ Internet Explorer™ or Netscape™ Communication™; a personal digital assistant (PDA) such as a Palm™ computing device running a web browser; or a wireless communication device providing access to the Internet or other computer network.

Using workstation 101, the user sends a search or retrieval request through communications network 102. In one embodiment of the present invention, communications network 102 is the Internet. One of ordinary skill in the art would appreciate that any other computer network could also be used with the present invention including, as some examples, a local area network (LAN), a wide area network (WAN), a corporate intranet, or a commercial service provider network. Workstation 101 connects the communications network 102 through a communications component. For example, in various embodiments of the present invention, the communications component includes a 56 Kbps modem, a network adapter, a cable modem, an ethernet card, or any other network access device.

Workstation 101 sends a request through communications network 102 to portal server 103. In one embodiment of the present invention, portal server 103 is a Sun™ Unix™ server running the Solaris™ operating system. The present invention could also be practiced using a Windows™ NT™ server, a Linux™ server, a Novell™ Netware server, or any other computing platform for portal server 103. Portal server 103 connects to communications network 102 through a communications component such as those discussed above with regard to workstation 101.

Portal server 103 receives a request from workstation 101 and formulates a request to metadata server 104. In one embodiment of the present invention, metadata server 104 is a Windows™ NT™ computing device running an LDAP directory server application. In this embodiment, portal server 103 uses standard LDAP requests to allow permission to retrieve metadata information across communications network 102. Metadata server 104 includes a communications component such as that described above with regards to workstation 101 and portal server 103.

In one embodiment of the present invention, the metadata is stored in XML/RDF format. This XML-encoded metadata is returned to portal server 103 in response to a request. Portal server 103 then sends a request to one or more of the appropriate information repositories 105. Each information repository 105 is a computing device connected to communications network 102 in the same manner as the above-mentioned servers. These repositories store a collection of information. Using the metadata obtained from metadata server 104, portal server 103 is able to identify and retrieve the most relevant information necessary to satisfy a user request.

Figure 2:
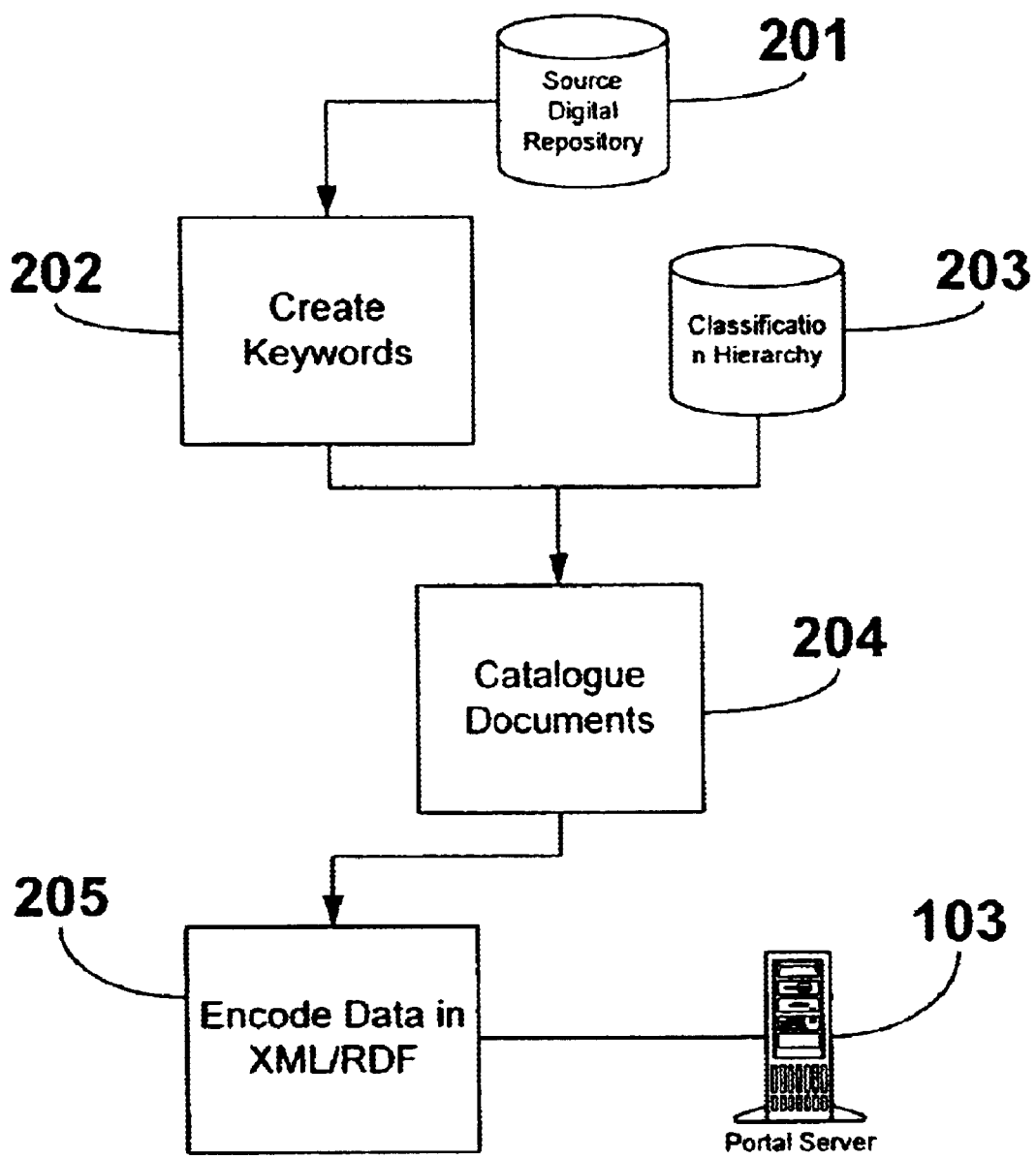
FIG. 2 depicts an automated cataloguing and index system according to one embodiment of the present invention.

FIG. 2 illustrates the automated cataloguing support process according to one embodiment of the present invention. In this embodiment, the system builds an indexed infrastructure, automatically cataloguing heterogeneous information repositories based on a pre-defined classification hierarchy. Once classified based on the ontology mapping, the documents and other relevant extracted metadata, the index represents the metadata using a RDF schema.

The Resource Description Framework (RDF) is an infrastructure that enables the encoding, exchange, and reuse of structured meta-data. It is an application of XML that imposes needed structural constraints to provide unambiguous methods of expressing semantics. This structural constraint allows the interchangeability of metadata defined by heterogeneous sources. RDF additionally provides a means for publishing both human-readable and machine-processable vocabularies designed to encourage the reuse and extension of meta-data semantics among disparate information communities.

One embodiment of the present invention uses the RDF schema standard for describing collections of documents that represent a single logical "bucket." Among other metadata information associated with a bucket, one embodiment of the present invention also includes a "classmark" property for a bucket or container. A classmark for a bucket is obtained by matching the bucket with a pre-defined classification hierarchy. This specification results in better search engine capabilities, and also helps in cataloguing for describing the content.

FIG. 2 shows the automated cataloging and indexing components of one embodiment of the present invention. In this example, source digital repository 201 stores various documents that are available for retrieval. This repository can be a digital library, a database, a website, or any other information repository.

According to one embodiment of the present invention, the system first collects keyword information as shown in 202. The information available in the repository is first scanned using a spider application such as Berkeley's SWISH-E™. The spider collects a list of all keywords contained in each document, generating an index to facilitate searching and further processing. The present invention could use additional spiders or other data collection applications.

In one embodiment of the present invention, the spider can be configured to traverse all available documents on source digital repository 201. The spider can also be configured to only traverse documents to a fixed depth.

Once a keyword index has been generated, one embodiment of the present invention uses classification hierarchy 203 to automatically catalogue documents as shown in 204. According to one embodiment of the present invention, classification hierarchy 203 is a predetermined classification system. There are many such classification systems currently in use. For example, the Department of Defense publishes the Defense Technical Information Center (DTIC) classification system; the Association for Computing Machinery publishes a computer science classification system; and the U.S. Patent and Trademark Office publishes a classification system of all technological arts. Any classification system can be used as a domain with the present invention to automatically catalogue and index documents.

The classification hierarchy 203 is a specific weighted domain ontology used to identify documents based on keywords found within each document. For example, according to one embodiment of the present invention, classification hierarchy 203 includes a hierarchical list of classifications. Each classification within the hierarchical list includes one or more keywords representative of that class. For example, one classification system includes a top-level classification labeled "Aviation Technology." Within this classification, there are three sub-classifications: "Aerodynamics"; "Aircraft"; and "Flight Control and Instrumentation." Each classification includes keywords representative of that class. For example, "Aerodynamics" includes "dynamics of testing,""wind tunnel," etc. These keywords are used to determine the most likely classification of a document. Thus, the classification hierarchy 203 functions as a thesaurus, assisting in the correct identification and classification of a document based on the keyword index generated in 202.

The present invention automatically catalogues documents in source digital repository 201 as shown in 204. The mapping of documents to one or more specific classifications can be performed in many ways. In one embodiment of the present invention, documents are catalogued by mapping keywords from 202 against a specific weighted domain ontology, such as classification hierarchy 203. In another embodiment of the present invention, a neural network is used to recognize which categories within classification hierarchy 203 are most likely relevant to the referenced document. One of ordinary skill in the art would recognize other methods to categorize documents in accordance with the present invention.

The automated cataloguing system is effective; however, it is not 100% accurate. To assist in increasing the overall accuracy of the collected metadata, one embodiment of the present invention includes a review process whereby the automatically suggested classifications are reviewed by a user to ensure they are accurate. In an additional embodiment, a user performs the cataloguing process; however, the automated cataloguing system is used to suggest an appropriate classification to the user, thereby aiding the human operator, increasing the operational speed and accuracy of the cataloguing process.

Once a document has been catalogued, metadata information is created and stored as shown in 205. In one embodiment of the present invention, metadata is encoded and stored in XML/RDF format. Other embodiments store metadata or update a key descriptor field in a database system, a flat file, or any other mechanism that provides a way to store and retrieve data. For example, for previously built indexes based on full word searching, the existing indexes can be updated with the cataloguing tool. This information can be used by portal server 103 to facilitate effective searching and retrieval of data stored in source digital repository 201.

FIG. 3 shows a data structure for containing metadata according to one embodiment of the present invention. The data structure includes the following attributes: (1) a URL; (2) a title; (3) an author; (4) an abstract; (5) a collection; (6) a keyword; (7) one or more matched words; (8) a path; (9) a classmark; (10) a classification date; and (11) a last modified date. Each of these attributes will be discussed in turn below.

The attributes in FIG. 3 are shown according to one embodiment of the present invention. One of ordinary skill in the art would understand that many variations of this data structure could be made without departing from the scope and spirit of the present invention. Additionally, this data structure is designed to record metadata for information stored on the web. The present invention could be used to record metadata about data stored in other formats. For example, the metadata could be used to facilitate searching of an Oracle™ database or any other relational or object-oriented database. In such an application, the metadata structure could be modified to better accommodate the stored data.

The URL attribute stores a uniform resource locator (URL), a property uniquely identifying the data. The most common URL is a web address. For example, "http://www.saic.research.com/RDF/source/agriculture1.txt" uniquely identifies the location of a web page. First, "http:" defines that protocol that is used to access the information. "HTTP" represents the standard protocol used on the web, the hypertext transfer protocol. Next, "www.saic.research.com" defines the server where the information is stored. On the Internet, computers communicate using the Internet Protocol (IP). When using this protocol, computers must convert host names to IP addresses using a distributed hierarchical database known as the Domain Name Service (DNS). This host name can be used to look up the IP Address in DNS. Finally, "/source/agriculture1.txt" identifies the path to the information. In combination, the entire URL defines the protocol to be used, the address of the server providing the information, and the path to the provided information.

The "Title" attribute gives the title of the resource. For most webpages, the title is displayed on the title bar on the top of a web browser. This data is intended to convey the general purpose and content of the document to a user.

The "Author" attribute identifies the person or persons who wrote the document. In one embodiment of the present invention, the "Author" attribute identifies the owner of the document within the server file system. Modem computer operating systems are designed to support multiple users. Each user logs on to the system using a user identifier. When a file is created on a computer, the user creating the file is recorded as the owner of that file or document. In one embodiment, this information is used to populate the "Author" attribute.

The "Abstract" attribute stores the document's or resource's abstract. The abstract gives a brief overview of the document designed to facilitate searching and allowing a user to quickly determine if a document is relevant.

The "Collection" attribute identifies the type of a resource. For example, a document may be a "Technical Report," a "Proposal," a "Refereed Journal," a "Thesis", and so on. This attribute is used to identify the general type of a document to assist in searching and retrieval of information.

The "Keyword" attribute is usually stored as a RDF Bag container. An RDF Bag container stores multiple values. Thus, the "Keyword" attribute can store one or more keywords. Each keyword is a word identified in a document that assists in identifying the subject matter of that document.

The "MatchedWords" attribute is one or more words from a document that match the classification. This attribute can include one matched word, or can contain an RDF Bag holding a plurality of matched words. For example in FIG. 3, the "MatchedWords" attribute includes "field" and "general."

The "Path" attribute identifies that path component of the URL as discussed above. For example in FIG. 3, the path is "source/agriculture1.txt." This identifies the location of the referenced document within the information repository system.

The "Classmark" attribute identifies a classification for a document. The classification can include one or more predetermined classification systems. For example, FIG. 3 shows two classifications; "Ordnance.Aerial Bombs" and "Ordnance.Underwater Ordnance". These classifications are within the Defense Department's DTIC classification system. In other embodiments of the present invention other classification systems are used. For example, the Association of Computing Machinery (ACM), an association for computing professionals, publishes a classification hierarchy for areas within the field of computing. Similarly, the U.S. Patent and Trademark Office publishes a classification hierarchy for all areas within the technological arts for classifying issued patents. In one embodiment of the present invention, the classmark attribute is assigned through an automated process.

The "Classification_date" attribute stores the date that a classmark was assigned to the referenced document. This identifies when the document was classified.

Finally, the "Last_modified" attribute stores the date the referenced document was last modified. In one embodiment of the present invention, this attribute is obtained from the operating system of the information repository. In modern computer operating systems, the date that a file is created and the date the a file was last modified are stored with each file on the system. Using this information, the date that a document was last modified can be obtained from the operating system and used to populate this field.

FIG. 4 shows a sample RDF schema according to one embodiment of the present invention. In this embodiment, the shown RDF schema defines a vocabulary for representing metadata. The RDF shown implements the data structure shown in FIG. 3 in an XML/RDF format. By defining an RDF vocabulary, XML/RDF-aware browsers can use the metadata information to search and retrieve information from the data store.

FIG. 5 shows a sample document encoded in XML/RDF using the vocabulary defined in FIG. 4.

Once documents have been categorized and metadata information has been stored, more effective searches can be performed using the system shown in FIG. 1. For example, a user can further restrict a search to a particular classification. If one possible classification is "Ordnance.Aerial Bombs," the user can restrict the search to only those documents with this classification in their classmark attribute. Additionally, a user's keyword search will be more effective by utilizing the "MatchedWords" and "Keyword" metadata attributes. By using an automated cataloguing process, the present invention provides more effective searching and information retrieval capabilities than the widely used keyword indexing systems.

Embodiments of the present invention have now been fully described. It will be appreciated that these examples are merely illustrative of the present invention. Many variations and modifications will be apparent to those of ordinary skill in the art.

What is claimed is:

1. A system for automatically cataloguing documents located in multiple heterogeneous repositories, the system comprising:

a scanning tool for scanning the multiple heterogeneous repositories to collect keywords for the documents located therein;

a keyword index to the documents built using the collected keywords;

a mapping toolfor mapping the documents using the keyword index to one or more classes, each of the one or more classes including keywords representative of that class; and a computing device for creating metadata indicative of each of the documents as defined by each of the documents' keywords and one or more classes and cataloguing each of the documents in an integrated library according to the metadata in a meta-index, wherein the meta-index retains the characteristics of each of the multiple heterogeneous repositories as applied to each of the documents such that a user may access one or more of the documents within the multiple heterogeneous repositories utilizing the meta-index; and further wherein the characteristics of the multiple heterogeneous repositories are transparent to the user when one or more of the documents are accessed using the meta-index.

2. The system according to claim 1, wherein the scanning tool is at least one spider.

3. The system according to claim 1, wherein the mapping tool is a domain ontology.

4. The system according to claim 3, wherein the domain ontology is a classification hierarchy.

5. The system according to claim 1, wherein the mapping tool is a neural network.

6. A method for automatically cataloguing documents located in multiple heterogeneous repositories, comprising:

scanning the multiple heterogeneous repositories to collect keywords from the documents located therein;

building a keyword index to the documents stored in the multiple heterogeneous repositories using the collected keywords;

mapping the documents using the keyword index into predetermined classes, wherein the mapping is performed using at least one mapping tool;

creating metadata information, including identification of the predetermined class, for the documents; and cataloguing each of the documents in an integrated library according to the metadata in a meta-index, wherein the meta-index retains the characteristics of each of the multiple heterogeneous repositories as applied to each of the documents such that a user may access one or more of the documents within the multiple heterogeneous repositories utilizing the meta-index.

7. The method of claim 6, wherein scanning the at least one information repository to collect keywords is performed by a spider.

8. The method of claim 6, wherein the metadata information is stored in the eXtensible Markup Language (XML) format.

9. The method of claim 6, wherein the metadata information is stored in the Resource Description Framework (RDF) format.

10. A system for automatically cataloguing documents located in multiple heterogeneous repositories, the system comprising:

means for scanning the multiple heterogeneous to collect keywords from the documents located therein;

means for building a keyword index to the documents stored in the multiple heterogeneous repositories using the collected keywords;

means for mapping the documents using the keyword index into predetermined classes, wherein the mapping is performed using at least one mapping tool;

means for creating metadata information, including identification of the predetermined class, for the documents; and means for cataloguing each of the documents in an integrated library according to the metadata in a meta-index, wherein the meta-index retains the characteristics of each of the multiple heterogeneous repositories as applied to each of the documents such that a user accesses one or more of the documents within the multiple heterogeneous repositories utilizing the meta-index.

11. A method for automatically cataloguing electronic documents located in multiple digital heterogeneous libraries comprising:

scanning each of the multiple digital heterogeneous libraries to ascertain identifying characteristics of the electronic documents located therein;

building an index to each of the electronic documents based on the identifying characteristics;

mapping each of the electronic documents to at least one predetermined class based on a comparison of the index of identifying characteristics to the keywords of a classification hierarchy associated with the at least one predetermined class; and cataloguing each of the electronic documents into at least one predetermined class within an integrated library according to the comparison, wherein the integrated library retains the characteristics of each of the multiple heterogeneous libraries as applied to each of the electronic documents such that a user accesses one or more of the electronic documents within the multiple heterogeneous libraries utilizing the integrated library.

12. The method according to claim 11, wherein the keywords of the classification hierarchy are weighted.

13. The method according to claim 11, wherein the comparison is performed using a neural network.

14. The method according to claim 11, further comprising: creating metadata for each of the electronic documents, wherein the metadata identifies the at least one predetermined class associated therewith.

* * * * *